H. M. QUACKENBUSH.
SPRING AIR-PISTOL.
No. 6,977. Reissued March 7, 1876.
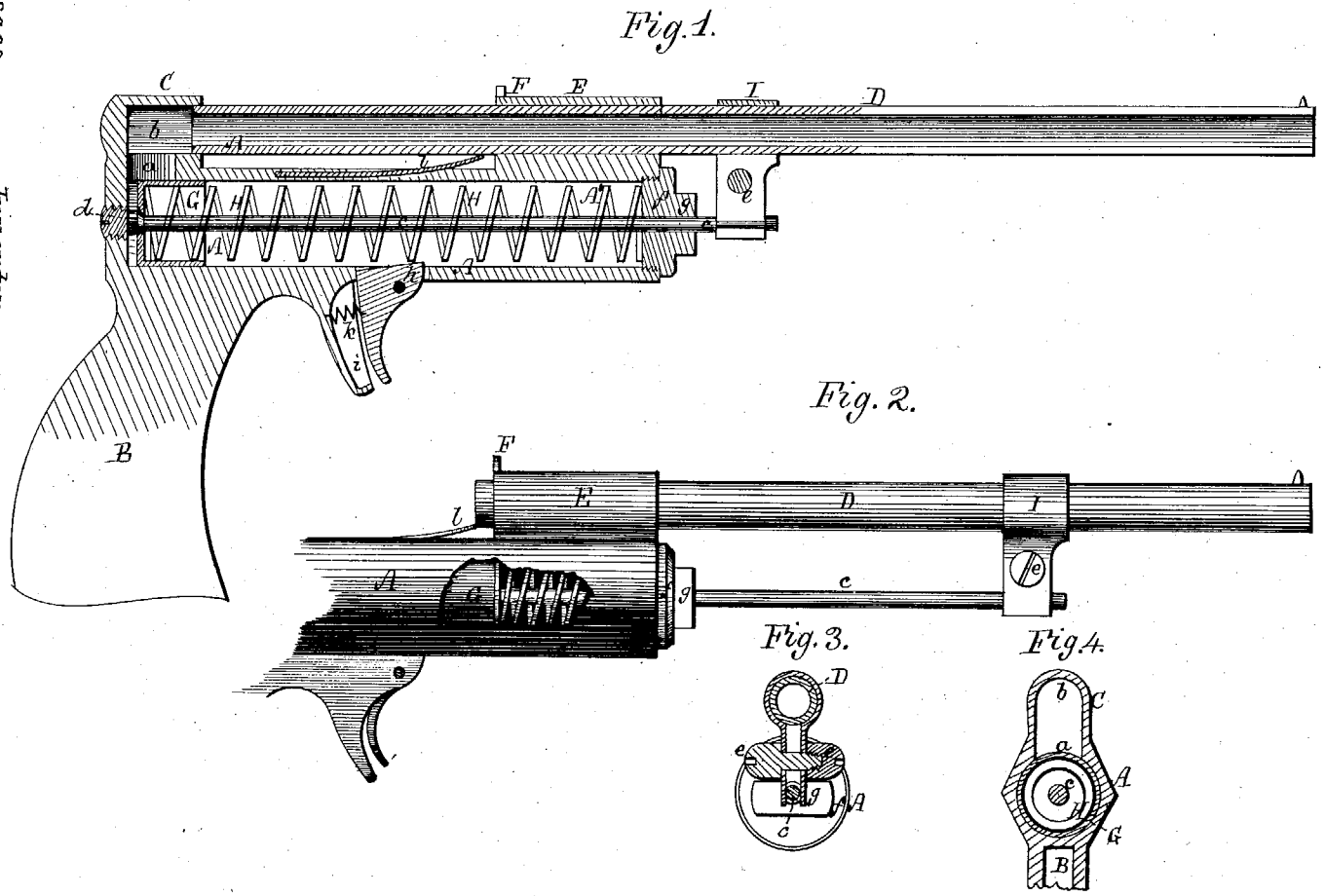
Witnesses.
F. Hunnewell
W. C. Boardman
Inventor.
H. M. Quackenbush.
F. Curtis. Att'y.

UNITED STATES PATENT OFFICE.

HENRY M. QUACKENBUSH, OF HERKIMER, NEW YORK, ASSIGNOR TO ALBERT A. POPE, OF BOSTON, MASSACHUSETTS.

IMPROVEMENT IN SPRING AIR-PISTOLS.

Specification forming part of Letters Patent No. 156,890, dated November 17, 1874; reissue No. 6,977, dated March 7, 1876; application filed February 11, 1876.

*To all whom it may concern:*

Be it known that I, HENRY M. QUACKENBUSH, of Herkimer, Herkimer county, New York, have invented certain Improvements in Air Guns or Pistols, of which the following is a specification:

This invention relates to a class of toy guns for shooting darts or other light projectiles, in which a plunger, impelled suddenly by the stress of a powerful spring within a closed chamber, whose outlet is the barrel of the gun, drives the air from such chamber through such barrel, and expels the projectile which has been placed in the rear or breech end of the barrel, the plunger being driven in a direction opposite to that taken by the projectile in its flight through the barrel.

The invention consists in a certain arrangement of parts, substantially as hereinafter explained, whereby I obtain greater efficiency in action in diminishing the gun when necessary.

The drawings accompanying this specification represent, in Figure 1, a longitudinal section of an air-pistol embodying my improvements. Fig. 2 is an elevation of a portion of the barrel and of the tubular receiver and air-reservoir which contains the plunger and spring. Figs. 3 and 4 are cross-sections of the pistol, the former being taken through the clasp which confines the barrel to the plunger, or the rod which forces the plunger against the pressure of the spring.

In these drawings, A represents a tubular case or cylinder, the chamber or interior A′ of which constitutes a reservoir for air, which enters and leaves it through a port or passage, *a*, in its upper part, a suitable pistol stock or handle, B, being cast integral with such cylinder, while upon the rear part of said cylinder or receiver I cast a hollow boss or hood, C, open at front to receive or coincide with the breech end of the barrel, and constituting the breech-block of the arm, the recess *b* of the recoil-block being a continuation of the air-port *a*, before referred to. The barrel is shown at D as mounted at its rear upon the top of the cylinder A, and sliding longitudinally thereof in a tubular stud, E, cast upon the upper part of such cylinder, the sight of the pistol being shown at F as attached to or making part of this stud. When the barrel is closed tightly up against the breech-block C by means of a powerful spring, as hereinafter explained, its bore constitutes the only passage for air from the cylinder A, and when such barrel is to be loaded it is moved away from the breech-block, and the dart or other projectile is inserted within its open end. Within the cylinder or receiver A I dispose a plunger, G, which is preferably tubular, and receives one end of a coiled spring, H, formed of a flat, thin ribbon of steel, this spring being disposed within the cylinder, and exerting a stress between the outer end or cap of the latter in one direction, and the plunger at the other, and consequently operating to impel the said plunger with great power and rapidity from one end of the cylinder to the other. As it is necessary to connect the barrel with the spring and plunger, in order that when the barrel is withdrawn in the act of loading the piston may be advanced and the spring contracted, and as I desire to obtain a connection of such character that I can readily detach the barrel from the other parts of the arm, I employ a yoke or clasp composed of a flat band, I, the fold of which clasps the barrel, while the ends inclose or straddle the outer end of a slender rod, *c*, which passes longitudinally and axially through the cylinder A and the plunger G, and is provided at rear with a head, *d*, of a size to advance the piston against the power of the spring. The two ends or straps of the clasp I are clamped toward each other and upon the rod *c* by set-screws *e e*, and by loosening these screws the gripe of the clasp upon the rod is relaxed, and the barrel may be instantly removed from the arm.

This mode of attaching the barrel to the plunger enables me to instantly and accurately adjust the relative positions of the barrel and spring and plunger with respect to the breech-block, and has the further advantage of entirely preventing scarring or defacement of the said barrel. The outer end or mouth of the cylinder A is closed by a cap or plug, *f*, which is screwed into it, this cap being formed with an integral nut or polygonal stud, *g*, to receive a wrench by which the cap is unscrewed, said cap serving to resist the stress of the spring H, and to confine the latter within the cylinder, and at the same time constituting a guide for the rod *c*. The trigger of the arm is shown at *h* as let into and pivoted within the handle B, and near the under side of the cylinder, the upper end of this trigger protruding into such cylinder to such an extent as to intercept the plunger when the latter is pushed forward to its greatest extent. The trigger-guard is shown at *i*, and the rear spring at *k*. Upon the top of the cylinder A, and below the barrel D, I place a plate-spring, *l*, which intercepts the barrel when the latter is advanced in the act of loading, and holds the barrel in this position against accidental release of the trigger until the said spring is lowered.

In using this pistol the barrel is grasped in one hand and pulled outward to such an extent that the plunger is advanced in front of the trigger, and the spring H contracted to its greatest extent. The dart or projectile is placed in the breech end of the barrel, the spring *l* lowered, and the barrel returned to place against the hollow breech-block C, the rod *c* returning with the barrel in order that the plunger may be free to slide upon without obstruction from its head. A pull upon the trigger releases the plunger, and the spring impels it suddenly and with great force to the rear, the air within the cylinder in rear of such piston being driven upward through the port *a*, breech-block C, and the barrel D, as a consequence driving the dart or projectile before it, and expelling it from the barrel. As the projectile escapes from the barrel the air enters the latter, and as the piston is advanced fills the cylinder A behind such piston.

By my construction I obtain great simplicity of construction, which enables me to manufacture these toys at comparatively small expense. I am also enabled to completely dismember the arm—that is, to remove the barrel or the spring and plunger—at a moment's notice by unscrewing one screw, *e*, on the one hand, or the cap *f* on the other, and I obtain a very neat, compact, and convenient pistol.

The arrangement of the barrel directly above and in line with the horizontal air-cylinder enables me to make both cylinder and barrel of greater length and capacity than heretofore practicable without materially increasing the size of the pistol, or making it at all cumbersome or unwieldy.

I claim—

1. In air-guns or pistols, the combination of a horizontal air-chamber, a barrel superposed on the said chamber, and having its rear end in communication therewith, a spring-impelled plunger within said chamber, and a piston or plunger-rod adapted to cock the plunger, and to then return to its first position independently of said plunger, substantially as set forth.

2. The sliding barrel D and cylinder A, in combination with the spring-impelled plunger G and rod *c*, connecting the plunger with the barrel for operation, substantially as set forth.

3. In combination with the barrel and the plunger-rod the adjustable clasp I, substantially as and for the purpose shown and described.

4. The cap, *f* with its stud *g*, in combination with the spring H, rod *c*, and barrel D, substantially as and for purposes stated.

HENRY M. QUACKENBUSH.

Witnesses:
WM. BULLIVANT,
LESLIE R. QUACKENBUSH.